July 26, 1960   K. M. MAIERSHOFER   2,946,269
CAMERA LATCH
Filed May 25, 1956
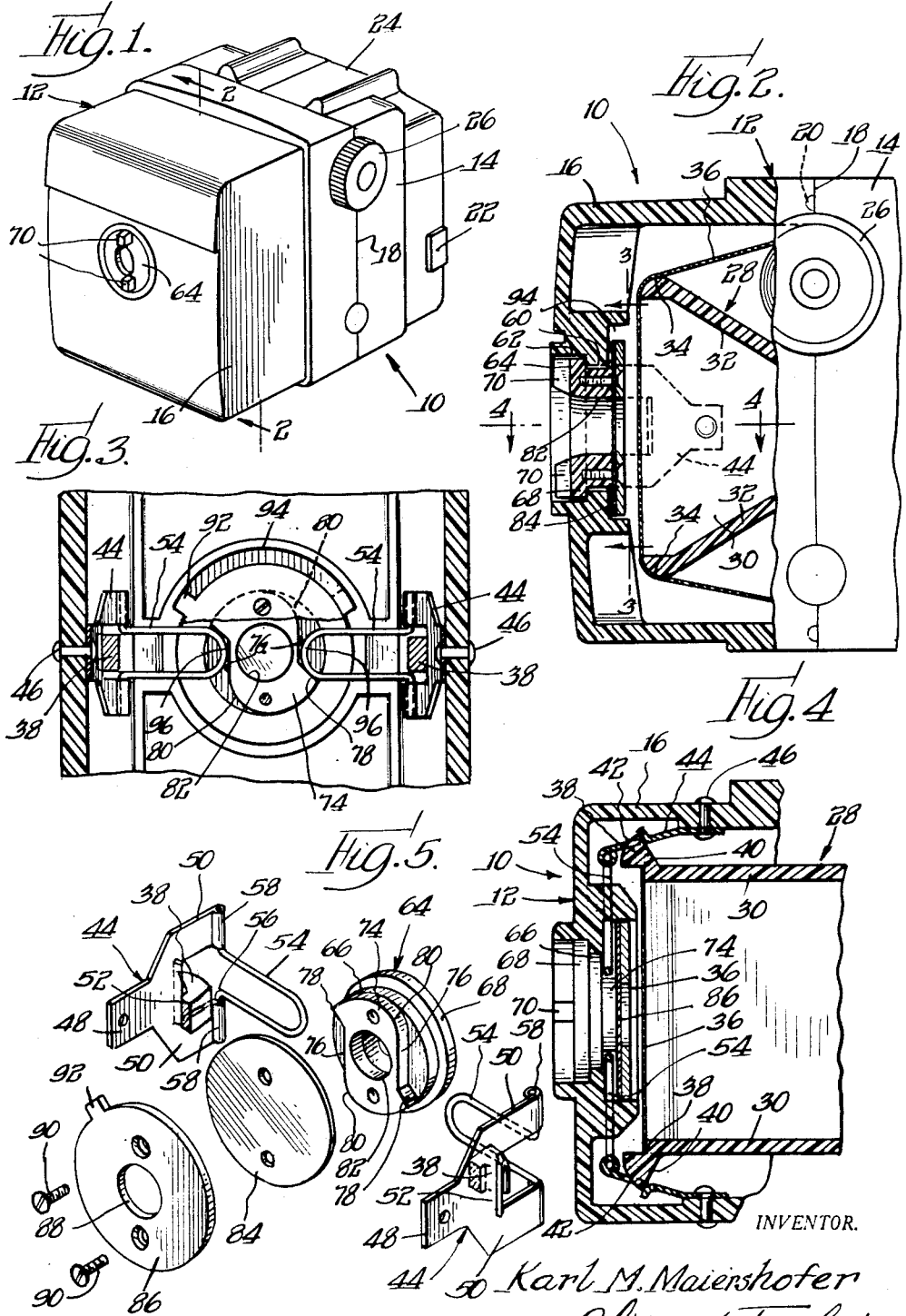
INVENTOR.
Karl M. Maiershofer
By: Olson & Trexler
att'y United States Patent Office 2,946,269
Patented July 26, 1960

2,946,269
CAMERA LATCH

Karl M. Maiershofer, Norridge, Ill., assignor to G-M Laboratories Inc., Chicago, Ill., a corporation of Illinois Filed May 25, 1956, Ser. No. 587,352

7 Claims. (Cl. 95—11)

This invention is concerned generally with the photographic arts, and more particularly with a latch for holding the parts of a camera together.

As will be understood by all of those skilled in the photographic arts, it is the universal custom to fabricate a camera body in two parts, or otherwise to provide a removable portion of the camera body for permitting access to the interior thereof, as for loading film. Obviously, no light can be allowed to enter the camera body (other than through the lens of the camera) when the body is closed and film is in the camera. Similarly, it is undesirable to permit the entrance of dust or moisture. Accordingly, the body portions should at all times fit tightly together.

In the case of the relatively expensive cameras, metal parts can be machined to high tolerances to insure a proper fit. However, in the case of lower priced cameras, economic considerations make it impossible to adhere to quite such close tolerances. Furthermore, in the case of the molded plastic bodies used in many cameras, it is substantially impossible to maintain tolerances as close as can be done in the case of machined metal parts.

Accordingly, it is an object of this invention to provide a camera latch which will hold two body parts tightly together in the absence of close manufacturing tolerances for the body parts.

More specifically, it is an object of this invention to provide a camera latch wherein two parts wedgingly engage one another to insure a tight fit of separable body portions.

Another object of this invention is to provide a simplified latch mechanism which allows camera parts to be assembled regardless of the operating position of the latch.

It is yet another object of this invention to provide a camera latch wherein any lost motion or "play" occurs between the movable latch member and the actuating means therefor, whereby to avoid any looseness between assembled camera body parts.

Other and further objects and advantages of the present invention will be apparent when taken in connection with the accompanying drawings wherein:

Fig. 1 is a perspective view of a camera incorporating a latch constructed in accordance with the principles of this invention;

Fig. 2 is a fragmentary view partly in vertical section as taken along the line 2—2 of Fig. 1;

Fig. 3 is a view from the inside of the camera showing the camera latch as taken along the line 3—3 of Fig. 2, certain parts being broken away;

Fig. 4 is a horizontal sectional view as taken along the line 4—4 in Fig. 2; and Fig. 5 is an exploded perspective view of the latch.

Referring now in greater particularly to the drawings, there will be seen a camera generally designated by the numeral 10 and including a body 12. In the illustrative embodiment, the body is molded of plastic and comprises a front part 14 and a rear or back part 16 joined along a line of separation or cleavage 18 by tongue and groove means 20 providing a light trap. The camera includes a lens, not shown, at the front end thereof, a shutter release 22 for operating the shutter associated with the lens, a view finder 24, and a film winding knob 26, all more or less in accordance with conventional practice.

The front body portion 14 includes a rearwardly projecting box-like portion 28 having parallel side walls 30 and diverging top and bottom walls 32. The top and bottom walls are provided with rounded off rear edges 34 over which the film 36 passes. The box-like structure 28 is open at the rear, as will be apparent, for passage of light rays from the lens to the film 36.

At the rear extremities of the side walls 30, and substantially midway from top to bottom thereof, there is provided a pair of retaining lugs or ears 38, there being one such lug or ear on each of the side walls 30. These lugs or ears preferably are molded integral with the box-like structure 28, these parts being formed of plastic. The lugs or ears are provided with beveled or cam surfaces 40 at the front portions thereof, and these surfaces comprise retaining surfaces on the lugs as will be apparent hereinafter. The rear surfaces of the lugs preferably are rounded off as at 42 to facilitate initial cooperation with the latch parts hereinafter to be set forth.

Spring metal latch members 44 are riveted at 46 to the opposite side walls of the rear or back body portion 16. The spring latch members 44 as best may be seen in Figs. 2 and 5 are of generally Y-shape, each having a stem 48, through which the rivet passes, and a pair of spaced apart arm 50. A straight retaining edge 52 extends between the arms in opposition to the beveled surface 40 of the adjacent lug or ear 38. Thus, when the front and rear body portions are assembled, the curved rear surfaces 42 of the lugs or ears 38 spread the spring metal retainers 44 apart until the lugs or ears enter the spaces between the pairs of arms 50. The spring metal latch members then spring in toward their initial positions, and the edges 52 wedge against the bevel surfaces 40. This wedging action against the bevel surfaces insures a tight fit at all times, regardless of variations in sizes of parts within wide limits.

U-shaped stiff wire members 54 are pivotally attached to the spring metal latch members 44 by having right angularly outwardly directed ends 56 thereon which are trapped by curled over ends 58 on the arms 50. The U-shaped wire members 54 are relatively long and narrow, and function as push rods in cooperation with structure hereinafter to be disclosed for releasing the latch members 44 from the lugs or ears 38.

The substantially vertical rear wall of the back portion 16 of the camera body is provided with a central aperture 60 which is countersunk at 62. A release member 64 best seen in Fig. 5 is mounted in the aperture 60 and countersink 62. The release member 64 comprises a cylindrical body 66 rotatably fitting in the aperture 60, and a head or flange 68 of disc-like configuration and of slightly greater diameter, the head being received in the countersink 62. The release member further includes a pair of finger pieces 70 (Figs. 1 and 2) accessible from the back of the camera for rotating the release member. The release member is completed by a cam 74 having opposed flat sides 76, angularly disposed stops 78, and rounded camming surfaces 80. All of the foregoing parts of the release member preferably are formed as an integral plastic molding, and a central cylindrical bore 82 extends axially through the release member.

A transparent red disc 84 is held against the inside of the release member 64 to provide the usual red window for viewing the numbers on the film. A flat ring 86 fits against the red disc 84 on the inside of the camera body rear portion 16. This ring is of greater diameter than the cylindrical body 66 of the release member, and prevents retraction of the release member and assembled parts from the aperture 60. The ring 86 is centrally apertured at 88, and is held in assembled relation with the red disc 84 and release member 64 by means of screws 90 extending through aligned openings in the ring and disc and threaded into apertures in the release member. Preferably the screws 90 are of the self-tapping variety to preclude the necessity of providing threads in the apertures or bores in the release member.

The ring 86 is provided with a radially extending lug or ear 92 which is received in an arcuate groove or recess 94 on the inside of the camera body to limit rotation of the assembly comprising the ring, disc, and the release member. The recess 94 is on the order of 120 degrees or slightly more in arcuate extent.

As may be seen in Figs. 3 and 4, the wire push members 54 normally are received adjacent the cam 74 between the cylindrical body 66 and the red disc 84 as backed up by the ring 86. With the latches 44 in closed or retaining position, the bights 96 of the push members substantially engage the stop edges or surfaces 78, and are positioned close to, but generally not quite in contact with, the flat cam portions 76. Rotation of the release member 64 (in a clockwise direction in Fig. 3, but counterclockwise from the outside of the camera as in Fig. 1) brings the curved camming portions 80 against the bights 96. This forces the spring retaining members 44 outwardly so that they clear the lugs or ears 38. The front portion of the camera body thus readily can be detached from the rear portion.

The body portions can be reassembled with the latch in released position as just described, followed by subsequent rotation of the release member to allow the spring metal retainers to return to latching position. Alternatively, the release member can be turned to latching position before such reassembling, and the spring latches will simply cam over and snap behind the lugs 38.

The wedging of the edges 52 of the spring metal latch members against the beveled or inclined surfaces 40 of the lugs or ears 38 insures a tight fit at all times, as previously has been noted. Since the bights 96 of the wire push members 54 normally do not quite engage the edges 76 of the cam 74, any variation in dimensions is taken up between the cam and the push members. Accordingly, there is no danger that the cam will bear against the push members when in locking position so as to hold the spring latches 44 pushed outwardly from their normal position in a manner that would prevent the proper wedging action between the latches and the lugs.

Thus, the latch mechanism as heretofore shown and described is practically foolproof in operation. It is simple and economical to fabricate, and it insures a tight engagement of the front and rear body portions at all times.

It is to be understood that the specific embodiment of the invention as herein shown and described is for illustrative purposes only. Various changes in structure will no doubt occur to those skilled in the art, and are to be understood as forming a part of the invention insofar as they fall within the spirit and scope of the appended claims.

The invention is hereby claimed as follows:

1. In a camera having a pair of relatively separable body portions detachably to be held together, a latching mechanism comprising a pair of oppositely oriented fixed members on one of said portions having cam retaining edges thereon, a pair of substantially Y-shaped sheet metal spring members, each of said spring members having a stem and a pair of arms with a latching edge between the arms, said members having the ends of the stems thereof mounted on the other of said portions in confronting relation with the fixed members, the latching edges thereof resiliently engaging the cam retaining edges of the fixed members, control members operatively connected to said Y-shaped members, and cam means operable on said control members to effect deflection of said Y-shaped members to move the retaining edges thereof away from the cam edges of the fixed members to free the two separable portions from detachment from one another.

2. In a camera as set forth in claim 1, a latch mechanism wherein the control members comprise substantially U-shaped wire push members pivotally connected to the Y-shaped members, and wherein the cam comprises a rotatable member having a circumferential cam slot receiving the bights of the wire push members.

3. In a camera as set forth in claim 2, the latching mechanism wherein the cam is provided with an axial bore providing a window for reading indicia on a film in the camera.

4. In a camera having a pair of relatively separable housing members presenting relatively telescoping body portions detachably to be held together as a substantially light-excluding housing, a latching mechanism comprising a fixed element on one of said body portions having a retaining edge thereon, a resiliently biased latching member mounted on the other of said body portions for movement between latching and unlatching positions, and being resiliently biased toward latching position in engagement with said retaining edge, and a cam member movable to a first position for shifting said latching member against its resilient biasing to effect disengagement thereof from the retaining edge of said fixed element and permit separation of said body portions, and said cam member being movable to a second position permitting restoration of said latching member to its biased position in latching engagement with the retaining edge of said fixed element when the body portions are assembled with the cam member in its first position and permitting snap engagement between the latching member and the retaining edge of said fixed element when the body portions are assembled with the cam member in its second position.

5. In a camera having a pair of relatively separable housing members presenting relatively telescoping body portions detachably to be held together as a substantially light-excluding housing, a latching mechanism comprising a fixed element on one of said body portions projecting outwardly therefrom toward the other body portion and presenting a cam retaining edge, a resilient biased latching member mounted on the said other body portion for movement between latching and unlatching positions and being resiliently biased toward latching position resiliently bearing against the cam edge of said fixed member in wedging engagement therewith to insure tight fitting between the said body portions, said cam retaining edge being oblique to the direction of movement of said latching member and in the path of movement thereof, and actuating means on one of said body portions for moving said latching member against its resilient biasing to effect disengagement thereof from the cam retaining edge of said fixed element and permit separation of said body portions.

6. In a camera as claimed in claim 5, wherein the latching mechanism comprises a pair of fixed elements each with a cam retaining edge and a pair of latching members cooperable therewith, and wherein said actuating means includes push members operatively engageable with said latching members to shift the said latching members against the resilient biasing thereof out of engagement with the cam retaining edge of said fixed elements to permit separation of the body portions.

7. In a camera as claimed in claim 6, wherein each of the push members comprises a U-shaped wire, and wherein the means operating on said push members comprises a rotatable cam having opposed grooves receiving the bights of the said U-shaped wires.

References Cited in the file of this patent

UNITED STATES PATENTS

| 154,408 | McKnight | Aug. 25, 1874 |
| 541,397 | Swartwout | June 18, 1895 |
| 884,787 | Woolfenden | Apr. 14, 1908 |
| 947,584 | Armstrong | Jan. 25, 1910 |
| 1,564,281 | Bornmann | Dec. 8, 1925 |
| 2,146,700 | Peterson | Feb. 7, 1939 |